No. 808,270. PATENTED DEC. 26, 1905.
H. P. ARBECAM.
ALIDADE OR INDICATOR FOR SHIPS' COMPASSES.
APPLICATION FILED APR. 24, 1905.
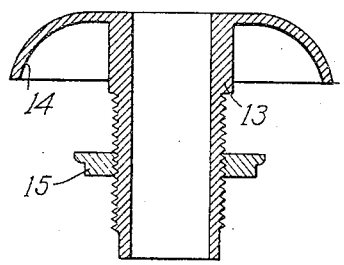
Fig. 6.
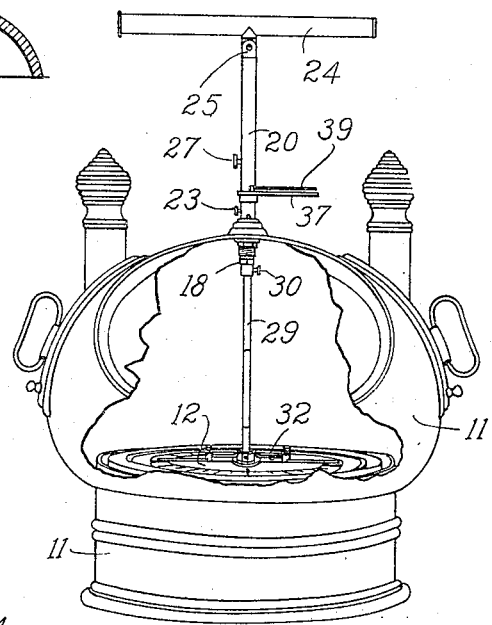
Fig. 1.
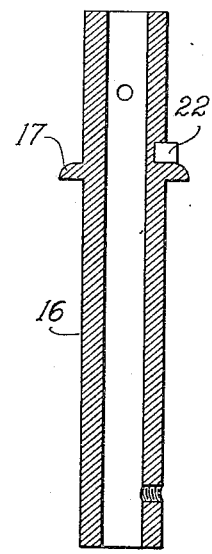
Fig. 7.
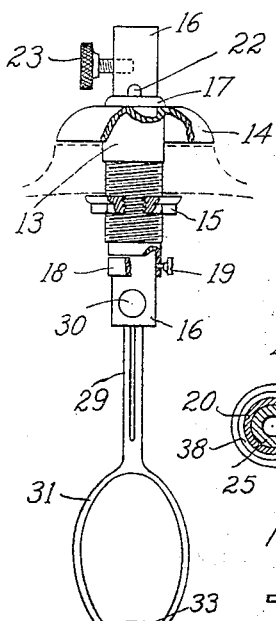
Fig. 2.
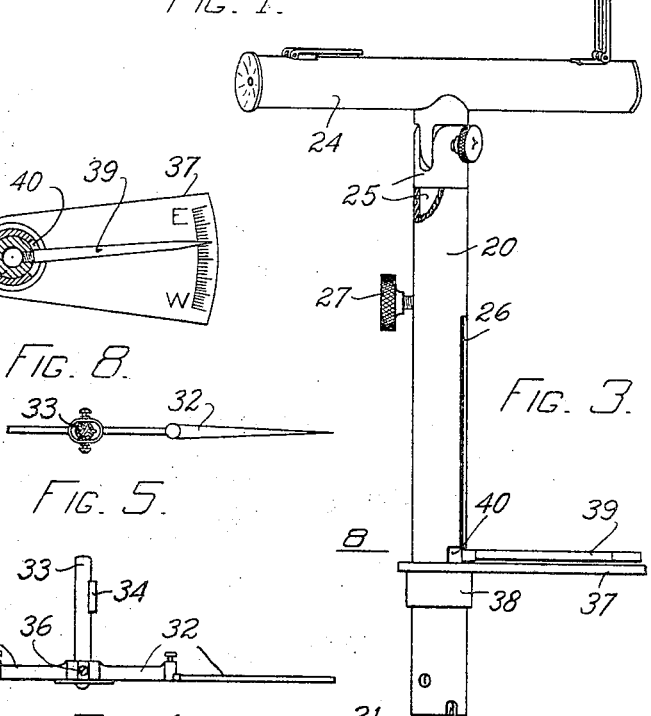
Fig. 8.
Fig. 3.
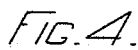
Fig. 5.
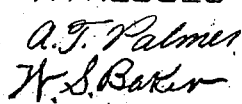
Fig. 4.
WITNESSES
A. T. Palmer
H. S. Baker
INVENTOR
HARRY P. ARBECAM
BY *[signature]*,
ATTY.

UNITED STATES PATENT OFFICE.

HARRY P. ARBECAM, OF BOSTON, MASSACHUSETTS.

ALIDADE OR INDICATOR FOR SHIPS' COMPASSES.

No. 808,270. Specification of Letters Patent. Patented Dec. 26, 1905.

Application filed April 24, 1905. Serial No. 257,230.

*To all whom it may concern:*

Be it known that I, HARRY P. ARBECAM, of Boston, in the county of Suffolk and State of Massachusetts, have invented certain new and useful Improvements in Alidades or Indicators for Ships' Compasses, of which the following is a specification.

The object of this invention is to provide for seagoing vessels an improved adjustable and self-adjusting compass indicator or alidade adapted to show accurately and instantly on the face of the compass-dial the nautical bearing of any object or point along the coast to which the sighting-tube above the binnacle hood or top may be directed.

The indicator rests on and extends across the compass-dial and is kept in exact alinement with the sighting-tube or pointer, both being connected to a central vertical shaft, but free to move in a vertical plane independently thereof. My device is peculiar in that while said shaft is adjustable and supported on the binnacle the indicator proper and its light central stem are self-adjusting and supported on the compass-dial.

In my improved apparatus the sighting-tube or pointer is pivoted at the top of a sectional vertical shaft or tube which is rotatable in a central socket in the binnacle-top, and such tubular shaft is formed of concentric parts comprising upper, central, and lower sections adjustable longitudinally with relation to each other to vary the height when desired. The lower section of said shaft within the binnacle hood or top has, preferably, a ring-shaped portion open axially to afford a free view of the lubber-mark, which might otherwise be at times concealed. The parts of the sectional shaft are vertically grooved or slotted and furnished with adjusting-screws engaging in or traversing such grooves or slots, so that longitudinal adjustment will not vary the alinement of the indicator with the sighting-tube. The indicator is pivoted centrally to its short vertical stem, which plays freely in the tubular lower end of the shaft and has a lip or lateral projection working in the slot in such end. Thus the indicator and its stem rest on the compass-dial and may rise and fall slightly with it, while the shaft is supported by the binnacle hood or top, leaving the compass free.

In the drawings, Figure 1 is a perspective view of a binnacle, partly broken away, with my apparatus applied over the compass. Fig. 2 is an elevation of part of the shaft and connected parts with an end view of the indicator. Fig. 3 is a perspective elevation of the sighting-tube and upper part of the sectional shaft, showing a compass-deviation corrector mounted thereon. Fig. 4 is a side elevation of the indicator proper; and Fig. 5, a top plan thereof, broken, the stem being in section on line 5 5 of Fig. 2. Fig. 6 is a vertical section of the socket-piece shown in Figs. 1 and 2. Fig. 7 is a like view of the central section of the shaft fitting in said socket. Fig. 8 is a top plan of the compass-deviation corrector seen in Figs. 1 and 3, the shaft being in section on line 8 8 of Fig. 3.

The binnacle 11 will be of any approved form and will inclose the compass 12, suspended as usual. The center of the binnacle-top is provided with a threaded tubular socket-piece 13, (see Fig. 6,) having a broad flange 14 at its upper end to rest upon the binnacle hood or top, and a tightening-nut 15, engaging its threaded body to hold such socket-piece firmly to the binnacle, as in Figs. 1 and 2, the binnacle-top being indicated in dotted lines in Fig. 2.

In Figs. 2 and 7, 16 represents the central tubular section of the rotatable shaft, which is formed with a fixed radial collar 17 to rest on the top of the socket-piece 13, within which the shaft fits loosely. A sliding ring 18, Figs. 1 and 2, fits on the lower part of this tube-section 16 and is secured thereto at the bottom of socket-piece 13 by a set-screw 19, Fig. 2. This central section of the shaft projects above and below the top of the binnacle, as best shown in Fig. 2, and each end has a hole to receive a screw which connects it to the other parts. The construction provides for adjustable extensions of such central section within the binnacle and above it.

Fig. 3 best represents the parts above the binnacle hood or top and which may be wholly removed together therefrom, as shown in Fig. 2. A tubular extension 20 fits on the upper end of shaft-section 16 and has a recess 21 in its lower edge to receive a stud 22, projecting from such section. (See Figs. 2 and 7.) A screw 23, Figs. 1 and 2, connects this tubular extension 20 to the shaft 16.

The sighting-tube 24 is pivoted to the upper end of a cylindrical rod 25, which is shouldered and reduced, as in Fig. 3, to fit within the tubular extension 20. I provide for vertical adjustment of the instrument, preferably by inserting a set-screw 27, threaded into said tubular extension and bearing against rod 25, so as to hold the sighting-tube at any height desired and readily readjust it. Tube 20 and the inclosed rod 25 so properly connected constitute the extensible upper member of the sectional vertical shaft. Within the binnacle the lower member of said shaft is a rod or tube 29, fitting adjustably within the tubular section 16 and secured thereto by a screw 30, Figs. 1 and 2. The tip of such screw enters a groove in said rod or tube, as seen in Fig. 2, so that vertical adjustment will not disturb the radial relation of these parts. In Fig. 1 this lower member 29 is shown as a straight rod or tube, while in Fig. 2, which is the preferable construction, it is represented as formed with a ring-like portion 31, open axially, so as to afford through it a view of the lubber-mark in the binnacle, which mark at all times indicates the position of the prow of the ship, and hence should be always visible. The sides of this ring 31 are spread in a plane at right angles to that of the sighting-tube 24, so that when the navigator is taking observations his view of the lubber-mark, the indicator, and that portion of the dial on which bearings are being taken will be wholly unobstructed.

The indicator 32 (best shown in Fig. 4) has a central vertical stem 33, to which it is pivoted by screws 36, such stem fitting loosely in the tubular lower end of the lower member 29 of the shaft. Said stem has a lateral lug 34, working in a slot 35 in the part 29, as seen in Fig. 2, so that while it may rise and fall slightly with the movement of the ship and compass the indicator has no rotary movement independent of the composite shaft. The foot of stem 33, which carries the indicator 32, rests on the compass-dial; but said stem and indicator are so light that they in no way interfere with the free action of the dial, the shaft 29 being supported on the binnacle hood or top. The indicator-arms 32 (best shown in Fig. 4) are extensible or adjustable in length to conform to compass-dials of different diameters. It will thus be seen that the indicator is self-adjusting vertically with relation to the shaft and sighting-tube, while the parts of the sectional shaft are relatively adjustable, owing to their concentric arrangement and their slot-and-screw connection, so as to adapt the apparatus to binnacles of various heights. It is also apparent that in use the indicator will always rotate with the shaft and be found in the same vertical plane as the sighting-tube, so as to show on the face of the compass the exact nautical bearing of any object to which said tube may point.

I combine with my device thus described the compass-deviation corrector, (shown in Figs. 1, 3, and 8,) consisting of a sector-plate 37, having a circular flange 38, secured firmly to the tube or sleeve 20, the sector-plate extending horizontally and having at its outer end a short arc graduated in degrees or points. (See Fig. 8.) Immediately above said sector-plate is a radial pointer 39, its inner end screwed or otherwise fixed in the shaft or tube 25 and its free end reaching to said arc. By slackening set-screw 27 tubular shaft 25 is released and pointer 39 may be moved to right or left of the center line of sector-plate 37 to a distance representing the known deviation of the compass-needle and the set-screw again secured. The sleeve 20 is slotted transversely, as at 40, Figs. 3 and 8, to permit this limited movement, and also vertically, as at 26, Fig. 3, to allow the pointer 39 to rise with shaft 25 when desired. Sighting-tube 24 being pivoted on the shaft-section 25 participates in these adjustments of pointer 39, as indicator 32 does not. By this construction when the navigator takes an observation through the sighting-tube of my instrument the bearing of the point or object is taken, not subject to a calculation for correction of deviation, but as already corrected and so denoted by the indicator 32 on the compass-dial. This is due to the described radial or angular adjustability of the pointer and sighting-tube with relation to the indicator and sector-plate, which compensates for the known deviation of the compass and enables the instrument to indicate true magnetic bearings when desired. I do not claim this deviation-corrector broadly, a similar device being shown and claimed in the patent to Camden, No. 790,871, dated May 23, 1905, and assigned to me. My improvement thereon consists in providing the tubular member 20 of the sectional shaft with the vertical slot 26 (seen in Fig. 3) to enable the protruding pointer 39 to rise therein when it is desired to elevate the sighting-tube 24, said pointer and sighting-tube being both mounted on the extensible inner member 25.

I claim as my invention—

1. The binnacle with its hood or top inclosing the compass, a rotatable, vertical shaft-section 16, formed with a concentric collar 17 by which it is supported centrally in the binnacle-top, an adjustable extension thereof above the binnacle-top, and a sighting-tube or pointer pivoted to the top of said extension, for rotation with said shaft-section and for movement independently thereof only in a vertical plane, in combination with an axial prolongation of said shaft-section within and wholly supported by the binnacle, such prolongation extending down almost to the compass-dial, and with a transverse indicator having a short vertical stem 33 concentric with such prolongation, adapted to rest upon but not connected with the compass-plate, and formed with a lateral lug 34 moving in a slot in the prolonged shaft, said indicator and stem having a limited vertical movement independent of the prolonged shaft, the indicator normally maintaining the same radial position as the sighting-tube, substantially as set forth.

2. The binnacle and its hood or top inclosing the compass, a central tubular shaft-section 16, mounted for rotation in the binnacle-top and extending above and below it, a tubular upward extension 20 secured to said section by screw 23, and an inclosed adjustable member 25, connected thereto by a binding-screw 27, these parts forming the upper shaft-section, and a downward prolongation extending from the central part and forming the lower section of the shaft, said section being longitudinally grooved or slotted to receive a binding-screw, whereby the parts are adjustable vertically without radial variation, in combination with the sighting-tube pivoted to the top of the upper section, and the transverse indicator connected to the foot of the lower section by a vertical stem concentric therewith resting loosely on the compass-dial, such tube and indicator having independent vertical movements, but normally maintained in the same radial plane, substantially as set forth.

3. The binnacle with its hood or top inclosing the compass, a vertical, rotatable shaft extending above and supported by the binnacle-top, and a sighting-tube secured to the upper end thereof, in combination with a downward prolongation of said shaft, formed in a single piece, having an open or ring-like portion spread in a plane at right angles to the sighting-tube, so that the shaft will be removed from the line of vision and the compass-dial will be unobstructed where bearings are being taken, and with an indicator mounted over the face of the dial, loosely connected to the foot of said shaft and maintained in radial alinement with said tube, substantially as set forth.

4. The described compass-indicator and deviation-corrector, comprising a sectional vertical shaft mounted rotatably in a supporting-bearing in the binnacle-top and provided at opposite termini with a sighting device and radial indicator normally maintained in the same vertical plane, the upper section of said shaft being extensible and consisting of an inner axial member having the sighting device pivoted to its upper end, and a deviation-pointer projecting rigidly in the same vertical plane from a point near its lower end, and of an outer tubular member surrounding said axial member, slotted lengthwise and crosswise to permit longitudinal and radial adjustment of the inner member and its protruding pointer, and with a terminally-graduated sector-plate fixed to and extending horizontally from said tubular member at the foot of said slots, for the purpose set forth.

In testimony whereof I have affixed my signature in presence of two witnesses.

HARRY P. ARBECAM.

Witnesses:
AARON BANCROFT,
C. B. BENNETT.